US006754182B1

United States Patent
Aznar et al.

(10) Patent No.: US 6,754,182 B1
(45) Date of Patent: Jun. 22, 2004

(54) METHOD AND APPARATUS FOR POLICING CELL-BASED TRAFFIC

(75) Inventors: Ange Aznar, La Colle s/Loup (FR); Daniel Orsatti, La Guade (FR); Jose Iruela, Saint Laurent du Var (FR); Bruno Rousseau, Vence (FR)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 09/691,508

(22) Filed: Oct. 18, 2000

(30) Foreign Application Priority Data

Oct. 21, 1999 (EP) .................................... 99480098

(51) Int. Cl.⁷ .............................................. H04L 12/26

(52) U.S. Cl. .................... 370/252; 370/230; 370/242

(58) Field of Search ............................ 370/229, 230, 370/232, 242, 235, 252, 389, 395.1, 395.21, 395.4, 395.2, 395.3

(56) References Cited

U.S. PATENT DOCUMENTS

| | | | | | |
|---|---|---|---|---|---|
| 5,361,253 | A | * | 11/1994 | Feijen et al. | 370/252 |
| 5,394,408 | A | * | 2/1995 | Nishihara et al. | 370/242 |
| 5,566,163 | A | * | 10/1996 | Petit | 370/230 |
| 6,466,542 | B1 | * | 10/2002 | Bottiglieri et al. | 370/395.21 |
| 6,674,716 | B1 | * | 1/2003 | Luijten | 370/230 |

OTHER PUBLICATIONS

Tsuchiya et al., The Worst Case Cell Arrival Patterns That Conform to the GCRA in ATM Networks, May 1995, IEEE, NTT Telecommunications Networks Laboratories, pp. 1432–1438.*

* cited by examiner

Primary Examiner—John Pezzlo
Assistant Examiner—David Odland
(74) Attorney, Agent, or Firm—Daniel E. McConnell; Bracewell & Patterson

(57) ABSTRACT

A method and system for enforcing a transmission control parameter for a virtual connection comprising multiple cells within an input port. The virtual connection has a nominal inter-cell arrival rate increment. Each of the cells are associated with a theoretical arrival time and an early arrival limit, wherein a difference of the early arrival limit from said theoretical arrival time delineates a lower boundary of a good zone, while the theoretical arrival time minus the sum of the early arrival limit and the nominal inter-cell arrival rate increment delineates an upper boundary of the good zone. The method includes determining an actual arrival time for an incoming cell from the cells that make up the virtual connection. Next, the actual arrival time is compared to the upper boundary and the lower boundary to determine whether or not the actual arrival time falls within the good zone. In response to determining that the actual arrival time falls within the good zone, the incoming cell is identified as conforming to the transmission control parameter. The method and system of the invention allow to use a finite counter for measuring elapsed time at entry ports of ATM switching nodes, a mandatory feature in order to enforce policing, while avoiding having to manage the overflows of the counter.

36 Claims, 4 Drawing Sheets

Modified GCRA
Arrival of a Cell at time ta(k)

TAT: Theoretical Arrival Time
ta(k) : actual arrival time of $k^{th}$ cell
I : increment i.e., inter-cell time
L : Limit

METHOD AND APPARATUS FOR POLICING CELL-BASED TRAFFIC

BACKGROUND OF THE INVENTION

1. Technical Field

The present invention relates generally to cell-based networks and more specifically to a method and apparatus for policing incoming cell-based traffic at network nodes.

2. Description of the Related Art

Traffic management in communications networks requires controlled use of network resources to prevent network traffic bottlenecks. In particular, when network resources are allocated to more connections or traffic than the resources can effectively support, network performance for users degrades (i.e., buffers start to overflow and delays increase beyond acceptable levels). Therefore, it is necessary to manage resource utilization and control network traffic so that the network can operate with acceptable efficiency even at during peak traffic periods.

Traffic management is a complex task in cell-switched ATM networks, due to the random nature of traffic arrival patterns and resulting unpredictable contention for network resources. In simple terms, cell-switched networks include a queue associated with each communication link at every switching node in the network. As the arrival rate at a link approaches its transmission rate capacity, the buffer queue length grows dramatically. As a node becomes congested, buffers start to overflow and cells that arrive at a time the buffer is full are discarded.

In accordance with higher level protocols, all of the cells within a message (stream) having dropped cells are eventually required to be retransmitted by an upstream node (or by the source), further increasing the traffic load on the network. As the number of retransmissions increases, more nodes become congested and more cells are dropped. Eventually, the network can reach a catastrophic state in which most of the packets in the network are retransmissions. Thus, the challenge in cell switching is to develop a framework that maximizes the utilization of network resources while controlling the traffic flow in the network so that the temporary periods of overload that occur due to the stochastic nature of the traffic do not turn into sustained periods of congestion.

One type of traffic control used in ATM cell-switched networks is flow control that regulates the rate at which the sender transmits cells (i.e., traffic shaping), to match the rate at which the destination station can receive data. To prevent the destination station from becoming overwhelmed, call admission control (CAC) is performed when a new connection request is received at the network. CAC is a call admission procedure that is executed to decide whether or not to accept or reject the call. A call is accepted if the network has enough resources to provide the Quality of Service (QoS) of the connection request without affecting the existing connections. However, call admission is not sufficient to prevent congestion because users may not stay within the connection parameters negotiated at the call setup phase. Several possible reasons for failing to remain within negotiated connection parameters include users not knowing or underestimating the connection requirements; user equipment malfunction; users deliberately underestimating their bandwidth requirements in order, for example, to pay less; or users deliberately trying to sabotage the network.

Thus, the network must include functionality to ensure that sources stay within their connection parameters negotiated at the connection setup phase. This function, referred to as traffic policing or usage parameter control (UPC), resides at the access point to the network. A policing function must detect a nonconforming source as quickly as possible and take appropriate actions to minimize the potentially harmful effect of the excess traffic. This is achieved transparently to conforming users, in that the traffic generated by such sources are not affected.

Actions that a policing function can take when a source is detected to be nonconforming include: Dropping violating cells; marking violating cells to be processed differently than conforming cells during periods of congestion; and adaptively controlling the traffic by immediately informing a source when it starts to violate its contract.

Enforcing traffic policing is thus a key to prevent congestion in ATM networks. To this end the leaky bucket scheme was first introduced by S. Akhtar, in a MS Thesis, "Congestion Control in a Fast Packet Switching Network", presented at Washington University, in 1987. The general idea behind this approach is that a cell, before entering the network, must obtain a token from a token pool. An arriving cell consumes one token and immediately departs from the leaky bucket if there is at least one available in the token pool. Tokens are generated at a constant rate and placed in a token pool. There is an upper bound on the number of tokens that can be waiting in the pool, resulting in discarding or marking tokens arriving after the token pool is full. The size of the token pool imposes an upper bound on the burst length and determines the number of cells that can be transmitted back-to-back, controlling the burst length. The maximum number of cells that can exit the leaky bucket is greater than the pool size, since while cells arrive and consume tokens, new tokens are generated and placed in the pool. A version of the leaky bucket scheme has been standardized by the ATM Forum Technical Committee in their Traffic Management Specification whose version 4.0 was published in April 1996 under reference af-tm-0056.000. The policing algorithm is referred to as Generic Cell Rate Algorithm (GCRA).

Though simple, GCPA must be run for every arriving cell so that the cell can be declared as conforming or nonconforming against the negotiated connection parameters. Moreover, GCRA must be run twice since two types of traffic behavior are considered. Traffic policing is enforced for Peak Cell Rate (PCR) so that no burst of cells can arrive in too short a period of time while a Sustainable Cell Rate (SCR) must be enforced over an extended period of time.

A cell is identified as conforming when it passes both tests. Considering the high transmission speeds encountered on ATM networks, with transmission lines up to 2.4 Gigabits per second ($2.4 \times 10^9$ b/s) (i.e., one cell arriving every 176 Nanosecond ($176 \times 10^{-9}$ s)) at switching nodes, GCRA is implemented in hardware. Thus, every simplification in the implementation of GCRA is valuable in facilitating its hardware implementation and reducing the number of steps and operations to be able to cope with the very high performances required at entry points of ATM networks.

SUMMARY OF THE INVENTION

A method and system for enforcing a transmission control parameter for a virtual connection comprising multiple cells within an input port are disclosed herein. The virtual connection has a nominal inter-cell arrival rate increment. Each of the cells are associated with a theoretical arrival time and an early arrival limit, wherein a difference of the early arrival limit from said 10 theoretical arrival time delineates a lower boundary of a good zone, while the theoretical arrival time minus the sum of the early arrival limit and the nominal inter-cell arrival rate increment delineates an upper boundary of the good zone. The method includes determining an actual arrival time for an incoming cell from the cells that make up the virtual connection. Next, the actual arrival time is compared to the upper boundary and the lower boundary to determine whether or not the actual arrival time falls within the good zone. In response to determining that the actual arrival time falls within the good zone, the incoming cell is identified as conforming to the transmission control parameter. The method and system of the invention allow to use a finite counter for measuring elapsed time at entry ports of ATM switching nodes, a mandatory feature in order to enforce policing, while avoiding having to manage the overflows of the counter.

DETAILED DESCRIPTION OF THE PREFERRED EMBODIMENT

Figure 1:
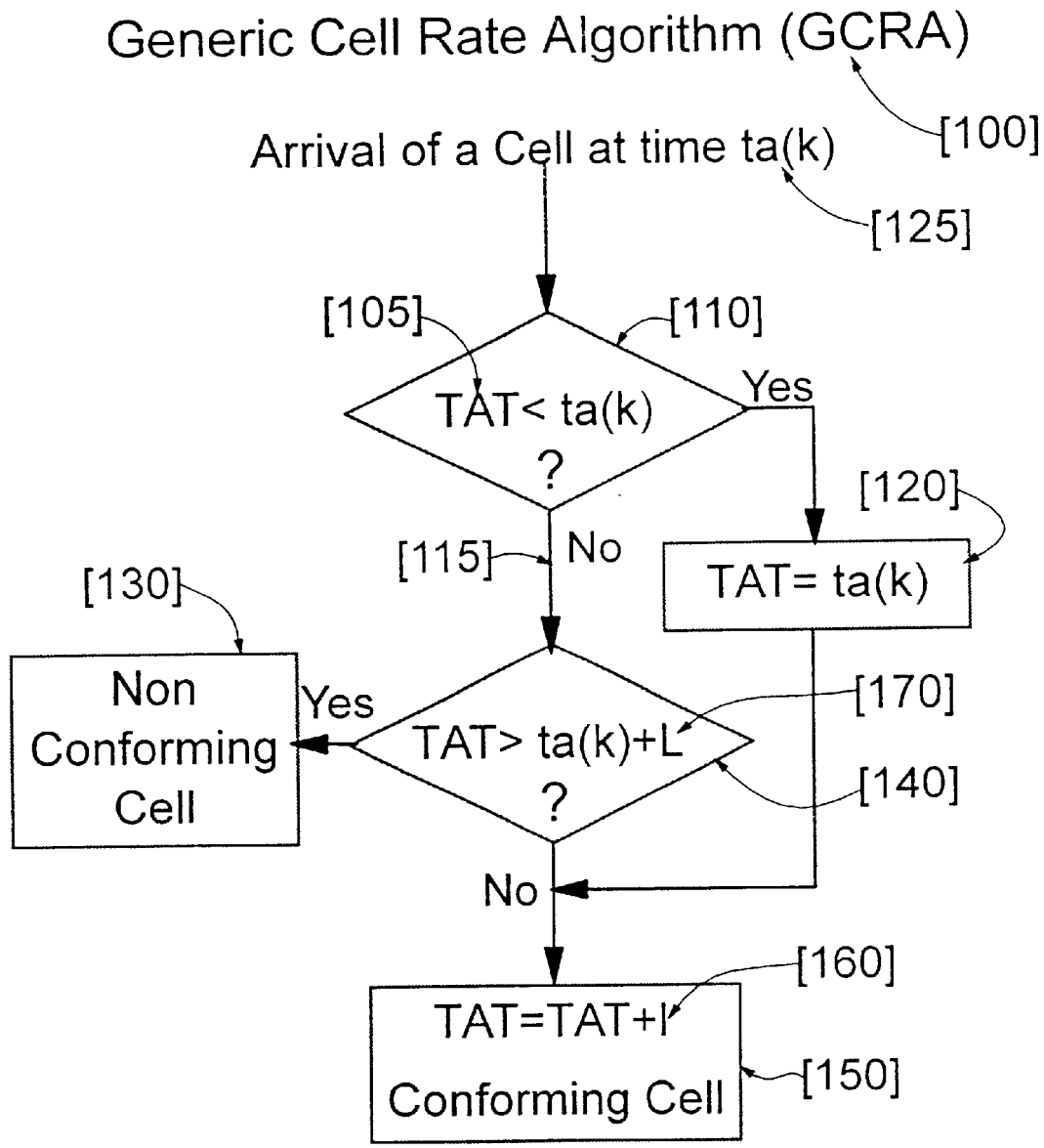
FIG. 1 depicts a prior art ATM traffic policing algorithm.

FIG. 1 describes a prior art GCRA algorithm 100 that is implemented in conventional ATM networks for policing all arriving cells to determine if the cells conform 150 or if they do not conform 130. As previously mentioned, an ATM policing algorithm is typically run twice. First, to police PCR (peak cell rate) and second, to police SCR (sustainable cell rate). What occurs after the cells have thus been categorized is beyond the scope of the present invention.

Generally speaking, conforming cells are normally accepted into the network while non-conforming cells may be disposed of immediately or tagged as candidates for later disposal in the event of network congestion. The present invention relates to policing incoming ATM traffic for cells that are arriving through an input port of an ATM network switching node at speeds of up to 2.4 Gigabits per second ($2.4 \times 10^9$ b/s)

Because many thousands of virtual connections must be supported at the input ports, each arriving cell must be first recognized as belonging to a particular virtual connection. After a cell has been identified as belonging to a particular virtual connection, the traffic parameters of the connection are retrieved. Specifically, an increment or inter-cell arrival time, I 160 sets a nominal rate at which cells for this virtual connection are expected to arrive. Further, a tolerance limit L 170 is a parameter utilized to determine when early-arriving cells are declared non-conforming 130.

An actual arrival time of every cell ta(k) 125 is compared, as shown at step 110, to a theoretical arrival time or TAT 105. If, as depicted at step 120, ta(k) 125 is larger than TAT 105 (the $k^{th}$ cell arrives after the point in time defined by TAT 105), TAT is reset to equal ta(k), and the current cell ($k^{th}$ cell) is determined to be a conforming cell as illustrated at step 150. As further depicted at step 150, TAT of the next arriving cell ($k+1^{th}$), to be received for that virtual connection, is incremented 150 by the nominal inter-cell time value I 160. Thus, cells that arrive late with respect to their theoretical arrival time, are always conforming, and TAT is then reset to the actual arrival time of the current cell.

If however, the result of the comparison shown at step 110 indicates that the arrival time of the $kt^{th}$ cell is earlier than nominally expected (i.e., ta(k) less than the current value of TAT) then, as depicted at step 140 a further test is performed. Current cell k is determined to conform if it does not arrive too early (i.e., stays within TAT minus L 170). As shown at step 140, GCRA 100 performs this test by adding the limit L 170 to the actual arrival time ta(k) 125 before comparing to TAT 105. If the value of ta(k) is less than the value of (TAT–L), the $k^{th}$ cell is determined to be too early and thus non-conforming as shown at step 130. It is worth noting that this branch 115 of the algorithm does NOT reset TAT to the actual arrival time of the current cell.

Figure 2:
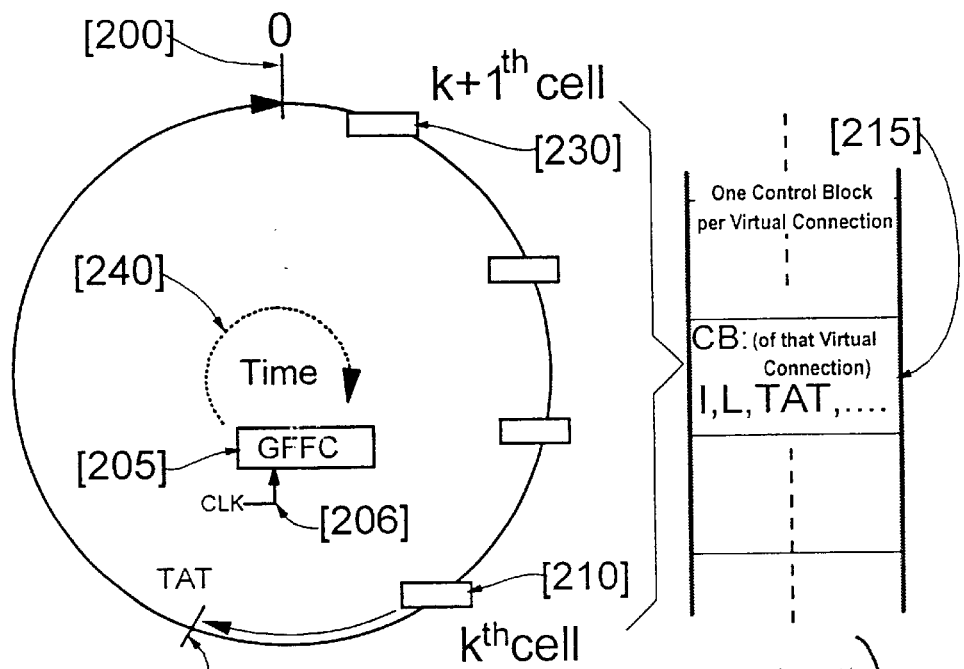
FIG. 2 illustrates problems associated with wrap that occur when implementing conventional ATM traffic policing techniques.

FIG. 2 discusses the actual implementation of GCRA in a conventional ATM network. Though simple, the algorithm must be carefully implemented in order to meet the 176 ns 2.4 Gbits/s requirement using a standard technology and process i.e., sub-micron Silicon CMOS ASIC (Application Specific Integrated Circuit) and avoiding the use of uncommon expensive technologies based on composite semiconductors e.g., Gallium Arsenic. Moreover, policing can only start after a cell has been recognized as belonging to a particular virtual connection and the corresponding usage parameters (including L and I discussed in FIG. 1) have been retrieved in the form of stored control blocks (CBs), one for each virtual connection 215. These sequential restraints add to the overall processing time of each arriving cell. Thus, although implemented in hardware, not all components of the overall cell receiving process can be executed in parallel.

The policing implementation depicted in FIG. 2 is further complicated by the fact that GCRA assumes a reference to the cells arrival time. In practice, this assumes that a global free-running finite counter (shared by all connections and CBs) and referred to as GFFC 205 in the following description, is implemented. GFFC 205 increments at each tick of a clock signal 206 and is utilized as a local timing reference 240 (a standard solution in ASIC), compatible with the fact that every CB is required to retrieve a time which must fit into a limited storage size. GFFC 205 is, however, a finite counter that will wrap 200 periodically. The duration between wraps depends upon the number of stages of GFFC 205 (in terms of numbers of bits) and the duration of each clock tick.

The clock tick, I, has a timespan that is determined by the results of a compromise between the accuracy or granularity to which time must be measured, and the number of bits one can afford to store in each CB. Thus, whenever GFFC 205 wraps, the time comparisons between ta(k) and an absolute TAT on which conventional GCRA relies as previously described in FIG. 1 at steps 110 and 140, no longer work. If not adequately resolved, this counter wrap problem causes unpredictable results including erroneous tagging of cells that normally conform and vice-versa.

The simplest way of illustrating the counter wrap problem is to assume a source stops emitting cells for some time after a $k^{th}$ cell 210 is received. The current TAT 220 (determined in accordance with the $k^{th}$ cell and stored in a corresponding CB) is surpassed by a long time when $k+1^{th}$ is actually received 230 resulting in GFFC 205 wrapping 200 and an erroneous processing of the $k+1^{th}$ by the GCRA illustrated in FIG. 1. Specifically, the $k+1^{th}$ cell will be processed through branch 115 rather than TAT being reset to the new actual arrival time, as shown in 120, and $k+1^{th}$ cell 230 is erroneously determined to be non-conforming. All cells arriving after $k+1^{th}$ cell 230 are similarly mis-identified until a cell arrives after TAT 220.

In the realm of possible solutions to this counter wrap problem, one may consider increasing the size of GFFC so that it never wrap over the life of the device in which it is implemented, or at least over its longest scheduled utilization period (at which time it must be reset). Since those devices are designed to operate 24-hour a day, 7-day a week, and since utilization approaches 100%, this time must be measured in terms of years. As an example, for a clock tick having a 10 nsec (i.e., $10^{-8}$ seconds) period, and to avoid wrapping over a one-year period of utilization ($3 \times 10^7$ seconds), GFFC 205 must be at least a 52-bit binary counter that will actually wrap after $4.5 \times 10^{15}$ seconds (about one year and a half). Although feasible, this solution assumes that a large field (52 bits) is stored for that purpose in each control block, and requires that correspondingly wide adders and comparators (necessarily slower for processing wider number fields) be available to perform the additions and comparisons required by the algorithm. Moreover, this approach assumes that devices in the field are observed to ensure that their actual utilization period does not exceed GFFC wrap time.

Another approach to solving the problem created by a finite counter for measuring time consists in updating all CBs. That is, when GFFC 205 wraps 200, all active control blocks must be updated so that, upon later reading them, it is apparent that GFFC 202 has wrapped. This solution requires a background task to handle this for the thousands of connections that may be active simultaneously in a receive port at an ATM switching node. Hence, this solution poses the practical problem of updating all the CBs starting immediately after counter has wrapped, and before the next use of a control block. A hardware implementation of this solution requires complex and precise functionality for ensuring that a control block is actually updated before its next utilization which is highly random and dependent on the incoming traffic. Nevertheless, this solution permits a reduction in the size of the field dedicated to store the time in a CB to its minimum which, in turn, is dependent upon the lowest bandwidth allocated to a virtual connection. This bandwidth parameter may vary from one application to another but a typical example is a compressed voice channel at 8 kilobits per second. A bandwidth on this order of magnitude implies that a period on the order of milliseconds must be measurable in one loop of the counter. For a clock tick period of 10 nanoseconds, as used in the previous example, GFFC 205 must be at least a 17-bit counter which wraps after 1.3 millisecond. This wrap time is considerably less than the 1.5 year previously estimated for a 52-bit counter in return for avoiding a hardware implementation of a complex background task to be run while cells are received at an overall rate up to 2.4 Gbps.

Figure 3:
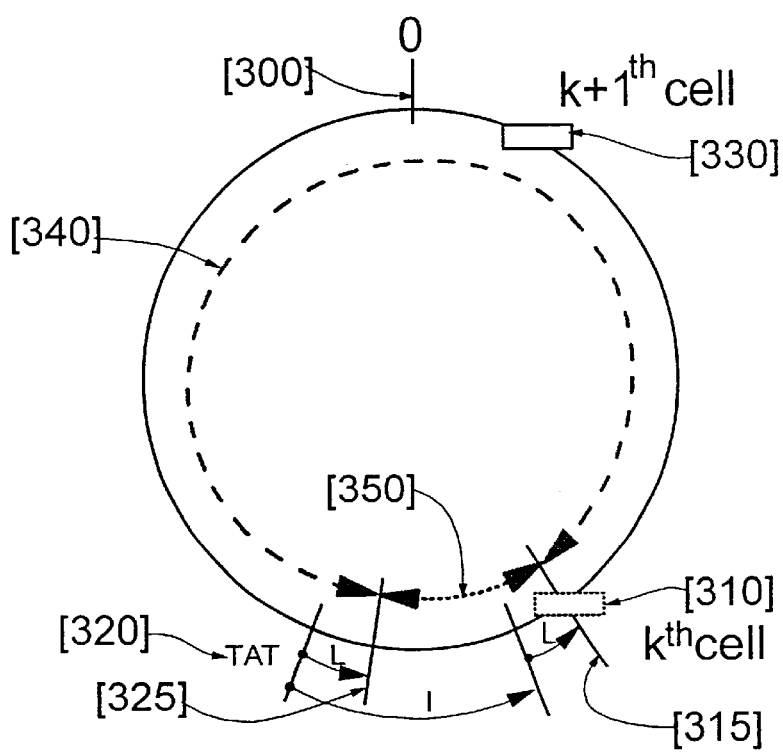
FIG. 3 depicts the principle of the invention.

FIG. 3 depicts the principle of the present invention which minimizes the aforementioned problems associated with counter wrapping. As illustrated in FIG. 3, implementation of the method of the invention results in analyzing each wrap period 300 as comprising two time zones. A good time zone 340 that encompasses the wrap 300 of the counter, starting with TAT minus L 325 (TAT computed when $k^{th}$ cell was received), and including the limit during which an early cell (earlier than TAT) is accepted, and ending at TAT minus (I+L) 315, corresponding to the earliest time $k^{th}$ cell could have possibly arrived (compatible with computed TAT 320).

The remainder of the time circle 350 is a bad zone during which unacceptably early cells arrive and must be tagged or discarded immediately. Utilizing this technique, only TAT 320 (computed when $k^{th}$ cell was received) must be stored in the control block along with L and I (the parameters characterizing the connection). When $k+1^{th}$ cell is received at time 330 then a lower bound 325 and an upper bound 315 delimit the good zone 340 (the bad zone being the complement of the good zone). Lower bound and upper bounds are computed on the fly and are compared to the actual arrival time of $k+1^{th}$ cell, allowing classification of an incoming cell as conforming or non-conforming in accordance therewith.

Figure 4:
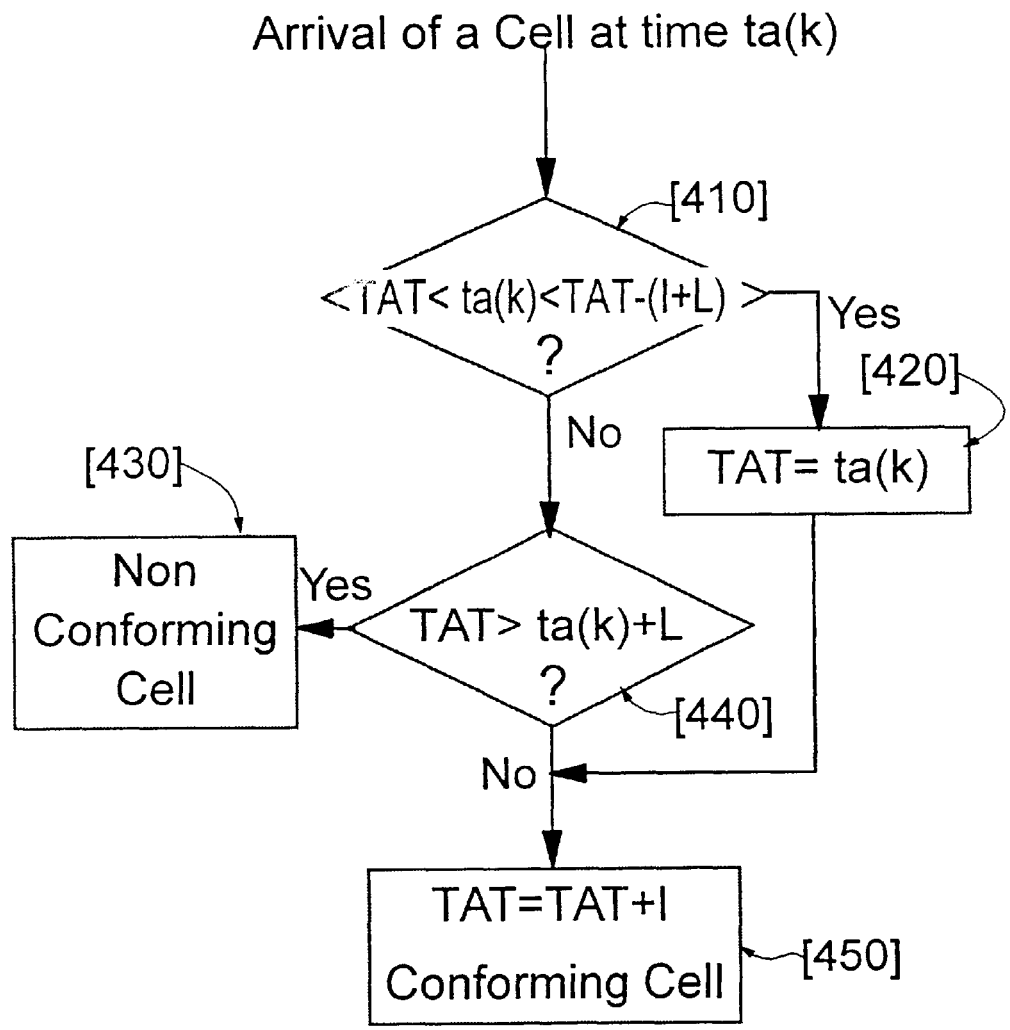
FIG. 4 is a flow diagram illustrating a cell-switched traffic policing technique in accordance with one embodiment of the present invention.

FIG. 4 is a flow diagram illustrating one embodiment of the present invention in which problems arising from counter wrap are minimized. The embodiment shown in FIG. 4, adds an upper limit (i.e., TAT−(I+L)) comparison as depicted at test step 410, in addition to the lower limit (i.e., TAT 320) corresponding to the upper and lower bound, respectively, of the good zone 340 discussed in FIG. 3. The two-part test illustrated at step 410 permits implementation of the principle of the invention discussed in FIG. 3. The remainder of the GCRA algorithm remains similar to that depicted in FIG. 1, meaning that the lower bound of the good zone is finally checked after test 440 (identical to step 140 in FIG. 1). The two-part analysis performed at step 410, in which the actual arrival time is analyzed in the context of a wrap period consisting of a good zone and a bad zone, allows for a simple adaptation to the existing GCRA algorithm and, thus, does not modify the way TAT is recomputed (step 450). It should be noted that steps 420, 430 and 450 are also identical to the corresponding steps 120, 130, and 150 illustrated in FIG. 1.

Figure 5:
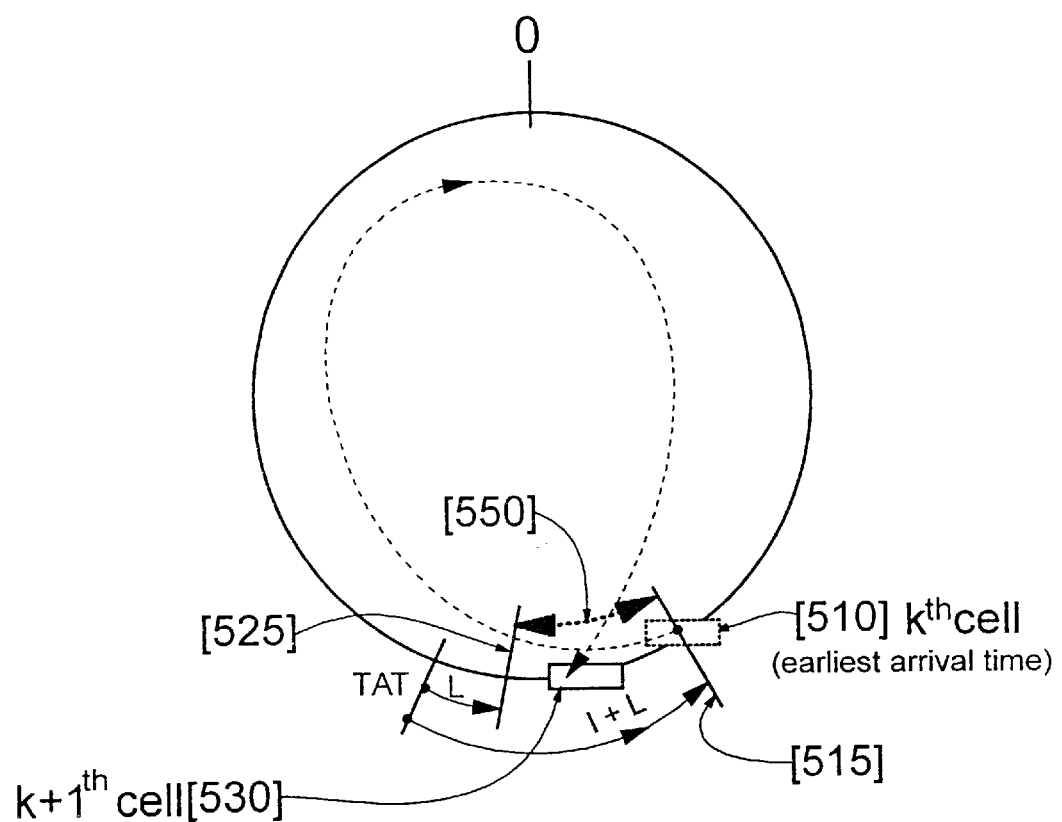
FIG. 5 depicts an enhancement of the present invention for reducing the number of erroneously discarded cells.

FIG. 5 depicts an enhancement of the present invention for reducing the number of erroneously discarded cells. Since computations are now performed modulo the value at which GFFC wraps, it is clearly apparent to those skilled in the art that if a very late $k+1^{th}$ cell 530 arrives in a bad zone 550 (between a lower bound 525 and an upper bound 515) after the GFFC has wrapped, the $k+1^{th}$ cell will be erroneously declared as non-conforming(all late and very late arriving cells do conform).

As illustrated in FIG. 5, a way to solve this problem requires noting that the probability of occurrence of such an event is intrinsically low and can be made as low as necessary attain an acceptable miss rate (erroneous discarding rate). In ATM networks switches and similar transmission equipment exhibit discard rates around $10^{-9}$ or better. To reach those values it is necessary that GFFC be wide enough (has enough bits) so that the ratio between the good zone and the bad zone 550 increases so that the value of $10^9$, or whatever value is acceptable, can be met for the lowest bandwidth connection that must be supported at an entry port of a switching node. It is also important to point out that occurrences of this problem are only possible after a long pause of the emitting source of cells which tends to drastically reduce the probability of such an occurrence. The practical consequence of implementing the solution depicted in FIG. 5 is that GFFC may have to be wider than strictly necessary to support the measurement of the lowest bandwidth connections. This lower bound was estimated to 17 bits in the discussion about FIG. 2 (for a compressed voice channel at 8 kilobits/sec). The lower bound remains, however, well below the upper bound of 52 bits that would be otherwise necessary for a never-wrapping (above one year) counter without the burden of having to implement a background task to handle overflows of GFFC.

What is claimed is:

1. A method for enforcing a transmission control parameter for a virtual connection comprising multiple cells within an input port, said virtual connection having a nominal inter-cell arrival rate increment, wherein each of said multiple cells are associated with a theoretical arrival time and an early arrival limit, said method comprising the steps of:

delineating a lower boundary of a good zone by determining a difference between the early arrival limit and the theoretical arrival time;

delineating an upper boundary of said good zone by determining the remainder after subtracting from the theoretical arrival time the sum of the early arrival limit and the nominal inter-cell arrival rate increment;

determining an actual arrival time for an incoming cell from said multiple cells;

comparing said actual arrival time to said upper boundary and said lower boundary to determine whether or not said actual arrival time falls within said good zone;and in response to determining that said actual arrival time falls within said good zone, identifying said incoming cell as conforming to said transmission control parameter.

2. The method of claim 1, further comprising the step of in response to identifying said incoming cell as conforming to said transmission control parameter, resetting said theoretical arrival time to said actual arrival time.

3. The method of claim 1, wherein said comparing step further comprises the steps of:
   determining whether or not said actual arrival time is greater than said theoretical arrival time; and
   determining whether or not said actual arrival time is less than said theoretical arrival time minus the sum of said early arrival limit and said nominal.

4. The method of claim 3, wherein said identifying step further comprises, in response to determining that said actual arrival time is greater than said theoretical arrival time and less than said theoretical arrival time minus the sum of said early arrival limit and said nominal inter-cell arrival rate increment, identifying said incoming cell as conforming to said transmission control parameter.

5. The method of claim 3, further comprising the step of, in response to determining that said actual arrival time is less than said theoretical arrival time or is greater than said theoretical arrival time minus the sum of said early arrival limit and said nominal inter-cell arrival rate increment, determining whether or not said actual arrival time is less than the difference of said early arrival limit subtracted from said theoretical arrival time.

6. The method of claim 5, further comprising the step of, in response to determining that said actual arrival time is less than said difference of said early arrival limit subtracted from said theoretical arrival time, identifying said incoming cell as not conforming to said transmission control parameter.

7. The method of claim 5, further comprising the step of, in response to determining that said actual arrival time is not less than said difference of said early arrival limit subtracted from said theoretical arrival time, identifying said incoming cell as conforming to said transmission control parameter.

8. The method of claim 1, further comprising the steps of:
   starting a finite counter for monitoring elapsed time in said input port;
   upon initializing said virtual connection:
      creating or updating a control block for said virtual connection; and
      storing traffic parameters in said control block, said traffic parameters expressed in units of said nominal inter-cell arrival rate increment and including:
         said nominal inter-cell arrival time; and
         said early arrival limit.

9. The method of claim 8, further comprising the step of computing said theoretical arrival time from said traffic parameters and a current value of said finite counter for a next arriving cell.

10. The method of claim 9, further comprising the step of storing said theoretical arrival time in said control block.

11. The method of claim 10, further comprising the step of, upon receiving said cell:
   determining said actual arrival time from said finite counter;
   identifying said virtual connection of said cell; and
   retrieving said control block of said virtual connection.

12. A system for enforcing a transmission control parameter for a virtual connection comprising multiple cells within an input port, said virtual connection having a nominal inter-cell arrival rate increment, wherein each of said multiple cells are associated with a theoretical arrival time and an early arrival limit, said system comprising:
   processing means for delineating a lower boundary of a good zone by determining a difference between the early arrival limit and the theoretical arrival time and delineating an upper boundary of said good zone by determining the remainder after subtracting from the theoretical arrival time the sum of the early arrival limit and the nominal inter-cell arrival rate increment;
   processing means for determining an actual arrival time for an incoming cell from said multiple cells;
   processing means for comparing said actual arrival time to said upper boundary and said lower boundary to determine whether or not said actual arrival time falls within said good zone; and
   processing means for, in response to determining that said actual arrival time falls within said good zone, identifying said incoming cell as conforming to said transmission control parameter.

13. The system of claim 12, further comprising processing means for, in response to identifying said incoming cell as conforming to said transmission control parameter, resetting said theoretical arrival time to said actual arrival time.

14. The system of claim 12, wherein said processing means for comparing further comprises:
   processing means for determining whether or not said actual arrival time is greater than said theoretical arrival time; and
   processing means for determining whether or not said actual arrival time is less than said theoretical arrival time minus the sum of said early arrival limit and said nominal inter-cell arrival rate increment.

15. The system of claim 14, wherein said processing means for identifying further comprises processing means for, in response to determining that said actual arrival time is greater than said theoretical arrival time and less than said theoretical arrival time minus the sum of said early arrival limit and said nominal inter-cell arrival rate increment, identifying said incoming cell as conforming to said transmission control parameter.

16. The system of claim 14, further comprising processing means for, in response to determining that said actual arrival time is less than said theoretical arrival time or is greater than said theoretical arrival time minus the sum of said early arrival limit and said nominal inter-cell arrival rate increment, determining whether or not said actual arrival time is less than the difference of said early arrival limit subtracted from said theoretical arrival time.

17. The system of claim 16, further comprising processing means for, in response to determining that said actual arrival time is less than said difference of said early arrival limit subtracted from said theoretical arrival time, identifying said incoming cell as not conforming to said transmission control parameter.

18. The system of claim 16, further comprising processing means for, in response to determining that said actual arrival time is not less than said difference of said early arrival limit subtracted from said s theoretical arrival time, identifying said incoming cell as conforming to said transmission control parameter.

19. The system of claim 12, further comprising:
   a finite counter for monitoring elapsed time in said input port;
   processing means for, upon initializing said virtual connection:
      creating or updating a control block for said virtual connection; and
      storing traffic parameters in said control block, said traffic parameters expressed in units of said nominal inter-cell arrival rate increment and including:
         said nominal inter-cell arrival time; and
         said early arrival limit.

20. The system of claim 19, further comprising processing means for computing said theoretical arrival time from said traffic parameters and a current value of said finite counter for a next arriving cell.

21. The system of claim 20, further comprising processing means for storing said theoretical arrival time in said control block.

22. The system of claim 21, further comprising processing means for, upon receiving said cell:

determining said actual arrival time from said finite counter;

identifying said virtual connection of said cell; and retrieving said control block of said virtual connection.

23. The system of claim 19, wherein said finite counter is a global free-running counter.

24. The system of claim 23, wherein said global free-running counter is a n-bit binary counter counting modulo $2^n$.

25. The system of claim 12, where in said processing means for delineating said good time zone functions to assure that said good time zone is large enough to ensure that the number of said multiple cells that are unduly identified as not conforming to said transmission control parameter remains below an acceptable level.

26. A computer program product for enforcing a transmission control parameter for a virtual connection comprising multiple cells within an input port, said virtual connection having a nominal inter-cell arrival rate increment, wherein each of said multiple cells are associated with a theoretical arrival time and an early arrival limit, said computer program product comprising:

instruction means for determining an actual arrival time for an incoming cell from said multiple cells;

instruction means for delineating a lower boundary of a good zone by determining a difference between the early arrival limit and the theoretical arrival time and delineating an upper boundary of said good zone by determining the remainder after subtracting from the theoretical arrival time the sum of the early arrival limit and the nominal inter-cell arrival rate increment;

instruction means for comparing said actual arrival time to said upper boundary and said lower boundary to determine whether or not said actual arrival time falls within said good zone; and instruction means for, in response to determining that said actual arrival time falls within said good zone, identifying said incoming cell as conforming to said transmission control parameter.

27. The computer program product of claim 26, further comprising instruction means for, in response to identifying said incoming cell as conforming to said transmission control parameter, resetting said theoretical arrival time to said actual arrival time.

28. The computer program product of claim 26, wherein said instruction means for comparing further comprises:

instruction means for determining whether or not said actual arrival time is greater than said theoretical arrival time; and instruction means for determining whether or not said actual arrival time is less than said theoretical arrival time minus the sum of said early arrival limit and said nominal inter-cell arrival rate increment.

29. The computer program product of claim 28, wherein said instruction means for identifying further comprises instruction means for, in response to determining that said actual arrival time is greater than said theoretical arrival time and less than said theoretical arrival time minus the sum of said early arrival limit and said nominal inter-cell arrival rate increment, identifying said incoming cell as conforming to said transmission control parameter.

30. The computer program product of claim 28, further comprising instruction means for, in response to determining that said actual arrival time is less than said theoretical arrival time or is greater than said theoretical arrival time minus the sum of said early arrival limit and said nominal inter-cell arrival rate increment, determining whether or not said actual arrival time is less than the difference of said early arrival limit subtracted from said theoretical arrival time.

31. The computer program product of claim 30, further comprising instruction means for, in response to determining that said actual arrival time is less than said difference of said early arrival limit subtracted from said theoretical arrival time, identifying said incoming cell as not conforming to said transmission control parameter.

32. The computer program product of claim 30, further comprising instruction means for, in response to determining that said actual arrival time is not less than said difference of said early arrival limit subtracted from said theoretical arrival time, identifying said incoming cell as conforming to said transmission control parameter.

33. The computer program product of claim 26, further comprising:

instruction means for monitoring elapsed time in said input port;

instruction means for, upon initializing said virtual connection:

creating or updating a control block for said virtual connection; and storing traffic parameters in said control block, said traffic parameters expressed in units of said nominal inter-cell arrival rate increment and including:

said nominal inter-cell arrival time; and said early arrival limit.

34. The computer program product of claim 33, further comprising instruction means for computing said theoretical arrival time from said traffic parameters and a current value of said finite counter for a next arriving cell.

35. The computer program product of claim 34, further comprising instruction means for storing said theoretical arrival time in said control block.

36. The computer program product of claim 35, further comprising instruction means for, upon receiving said cell:

determining said actual arrival time from said finite counter;

identifying said virtual connection of said cell; and retrieving said control block of said virtual connection.

* * * * *